United States Patent [19]
Onimaru et al.

[11] Patent Number: 5,252,816
[45] Date of Patent: Oct. 12, 1993

[54] OPTICAL INFORMATION READING APPARATUS

[75] Inventors: Sadhisa Onimaru, Okazaki; Atsuo Ishizuka, Nishio; Atsushi Hashikawa, Okazaki; Yasuhiko Koike, Handa, all of Japan

[73] Assignees: Nippondenso Co., Ltd., Kariya; Nippon Soken, Inc., Aichi, both of Japan

[21] Appl. No.: 711,536

[22] Filed: Jun. 10, 1991

[30] Foreign Application Priority Data

Jun. 8, 1990 [JP] Japan .................................. 2-151354

[51] Int. Cl.⁵ .............................................. G06K 7/10
[52] U.S. Cl. .................................... 235/467; 235/470; 235/472
[58] Field of Search ................. 235/467, 470, 472; 250/236; 350/6.9

[56] References Cited

U.S. PATENT DOCUMENTS

| | | | |
|---|---|---|---|
| 3,643,068 | 2/1972 | Mohan et al. | 235/467 |
| 4,871,904 | 10/1989 | Metlitsky et al. | 235/467 |
| 4,967,076 | 10/1990 | Schuhmacher et al. | 235/467 |
| 5,099,110 | 3/1992 | Shepard et al. | 235/467 |

FOREIGN PATENT DOCUMENTS

| | | |
|---|---|---|
| 0295936 | 12/1988 | European Pat. Off. . |
| 0323026 | 7/1989 | European Pat. Off. . |
| 0425844 | 5/1991 | European Pat. Off. . |
| 60-238809 | 11/1985 | Japan . |
| 63-269263 | 11/1988 | Japan . |

*Primary Examiner*—Harold Pitts
*Attorney, Agent, or Firm*—Cushman, Darby & Cushman

[57] ABSTRACT

An optical information reading apparatus such as a bar code reader includes a mirror drive unit rotatable to oscillate a movable scanning mirror simultaneously about a first axis and a second axis perpendicular to the first axis so that a laser beam irradiated from a laser unit is directed by the movable scanning mirror vertically and horizontally to scan parallel arranged plural rows bar codes with a raster scanning pattern. Since the raster scanning pattern can be formed by the combination of a single scanning mirror and a single mirror drive unit, the optical information reading apparatus is simple in construction and compact in size. In addition, the number of vertical scanning lines is not limited as opposed to a limited number of vertical scanning lines formed a polygon mirror incorporated in the conventional apparatus.

21 Claims, 7 Drawing Sheets

OPTICAL INFORMATION READING APPARATUS

BACKGROUND OF THE INVENTION

1. Field of the Invention

The present invention relates to an optical information reading apparatus, such as a raster scan type bar code reader for reading items of optical information on a plurality of parallel rows of bar codes.

2. Description of the Prior Art

Information reading apparatus such as bar code readers have been widely used in recent years as input terminals in a point-of-sale system (POS) or as terminals in an automated production control system forming a part of the factory automation (FA).

A conventional raster scan type bar code reader shown in Japanese Patent Laid-open Publication No. 63-269263 includes a vertical scanning mirror and a horizontal scanning mirror which are driven by corresponding drive mechanisms to form a raster by a scanning light beam.

Another conventional bar code reader disclosed in Japanese Patent Publication No. 1-31235 includes a rotating polygon mirror which is disposed with its axis of rotation tilted at a proper angle relative to an axis of its polygonal body. With this construction, a scanning light beam incident to the rotating polygon mirror is scanned not only in a horizontal direction but also in a vertical direction.

Both of the foregoing conventional bar code readers, however, have drawbacks described below.

The first-mentioned conventional bar code reader is complicated in construction and large in size because it requires two scanning mirrors (namely, vertical and horizontal scanning mirrors) and two drive mechanisms associated respectively therewith, The last-mentioned conventional bar code reader in which a tilted polygon mirror is employed for bidirectional scanning has a limited number of vertical scanning lines. In the polygon mirror, each face undertakes a single scanning in the horizontal direction. To this end, each mirror face must have a certain size. Due to its peculiar polygonal shape, the polygon mirror, therefore, has a limited number of mirror faces. Due to this limited number of mirror faces, the number of the vertical scanning lines is also limited.

SUMMARY OF THE INVENTION

With the foregoing drawbacks of the prior art in view, it is an object of the present invention to provide an optical information reading apparatus which is simple in construction, compact in size and able to form a plurality of scanning light beams from a scanning light beam irradiated from a light source.

To attain the foregoing object, there is provided according to the present invention, an apparatus for reading optical information on an object, comprising: a light source for irradiating a scanning light beam; means rotatable about a first axis and also about a second axis perpendicular to said first axis for reflecting the scanning light beam irradiated from the light source onto the object bearing the optical information; means rotatable to oscillate the reflecting means simultaneously in first and second directions perpendicular to one another about the first and second axes for forming a raster scanning pattern by the scanning light beam irradiated on the object; drive means for rotating the forming means; and means for receiving light reflected from the object and reading the optical information on the object.

With this construction, the reflecting means is rotatable about two axis perpendicular to each other to reflect the scanning light beam from the light source onto the optical information on the object. The forming means is rotatable to oscillate the reflecting means in a first direction and a second direction perpendicular to the first direction so that the scanning light beam irradiated from the light source forms a raster scanning pattern on the object.

Thus, the scanning light beam irradiated from the light source forms a predetermined pattern of scanning lines such as a raster scanning pattern by the aid of a combination of the reflecting means and the forming means, without using a polygon mirror. The optical information reading apparatus thus constructed is simple in construction and compact in size. In addition, due to the absence of the polygon mirror, the apparatus of this invention is free from the problem that the number of vertical scanning lines is limited depending on the area of each face of the polygon mirror.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
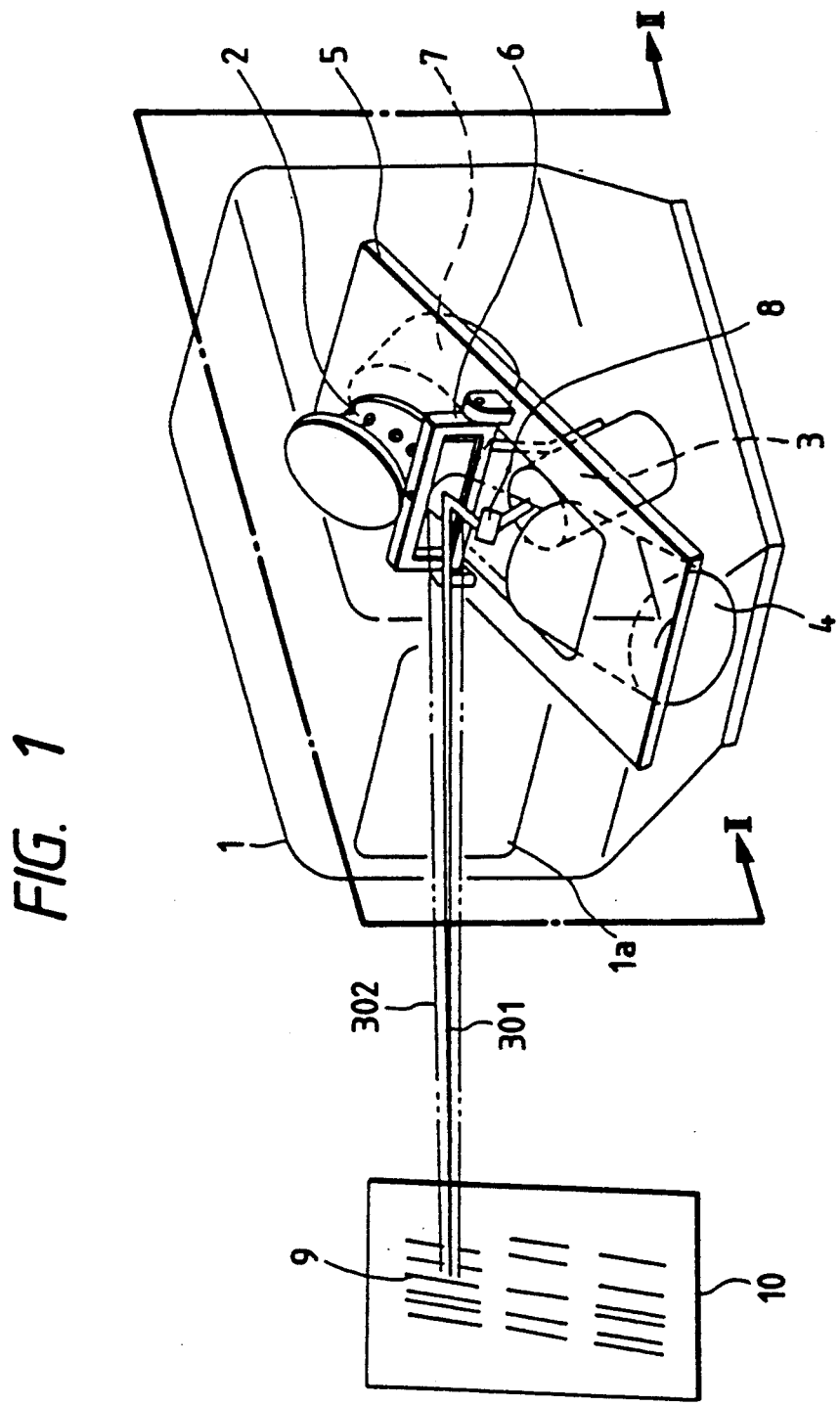
FIG. 1 is a diagrammatical perspective view showing the inside structure of a bar code reader constituting an optical information reading apparatus according to one embodiment of this invention.

The present invention will be described in greater detail with reference to certain preferred embodiments shown in the accompanying drawings in which like reference characters designate like or corresponding parts throughout the several views. In the illustrated embodiments, the invention is embodied in an optical information reading apparatus comprising bar code readers of the raster scan type.

As shown in FIG. 1, the bar code reader 1 is of the stationary type and includes a transparent reading window 1a through which a laser beam 301 is irradiated over a plurality of parallel rows of bar codes 9. Light 302 from the laser beam which strikes the bar codes 9 is reflected back toward the window 1a and passes through the window 1a to the inside of the bar code reader 1. The inside structure of the bar code reader 1 is described below with reference to FIGS. 1 and 2.

A mirror drive unit 2 which constitutes a raster forming means is coupled to a motor 7 via a driving force transmission unit 7a (FIG. 2) receive a rotational driving force from the motor 7. The motor 7 constitutes a drive means for rotating the mirror drive unit 2. Upon receipt of the rotational driving force, the mirror drive unit 2 rotates to drive a scanning mirror 6.

Figure 8:
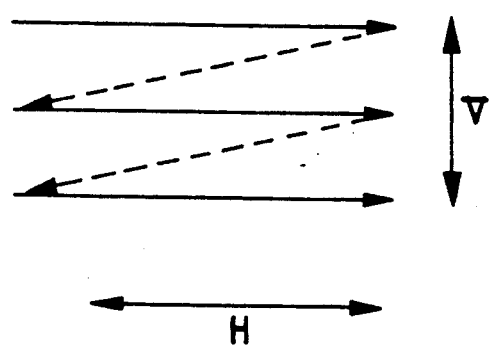
FIG. 8 is a diagram showing a raster scanning pattern of the scanning laser beam formed by the scanning mirror shown in FIG. 1.

The scanning mirror 6 which constitutes a reflecting means is rotatable about a first axis extending in a horizontal direction and also about a second axis extending in a vertical direction. When the rotational driving force is transmitted from the motor 7 to the mirror drive unit 2, the scanning mirror 6 is driven by the mirror drive unit 2 to pivot or oscillate in vertical and horizontal directions about the first and second axes, so that a raster scanning pattern such as shown in FIG. 8 is formed on the each bar code 9.

The construction and operation of the mirror drive unit 2 and the scanning mirror 6 will be described later in greater detail.

A laser unit 3 which constitutes a light source is supported by a support member 5a (FIG. 2) mounted on a base 5 and irradiates a laser beam 301 in a direction perpendicular to the plane of the base 5. The laser unit 3 includes a focusing lens (not shown) disposed therein for focusing the laser beam 301 onto the bar code 9 via the scanning mirror 6.

A light signal receiving unit 4 which constitutes a reading means is constructed to receive the reflected scanning laser beam 302 coming from the bar code 9 via the scanning mirror 6. The reflected scanning laser beam 302 thus received is subjected to a photoelectric conversion process through which it is converted into an electric analog signal which changes with changes in the intensity of the reflected scanning laser beam 302. The analog signal is subsequently digitized or converted into a proportional digital signal which is in turn subjected to a data conversion process. The output data signal thus obtained is transmitted to a central processing unit, not shown, in a point-of-sale system (POS), for example. The optical information on the bar code is thus read by the light signal receiving unit 4.

Figure 7:
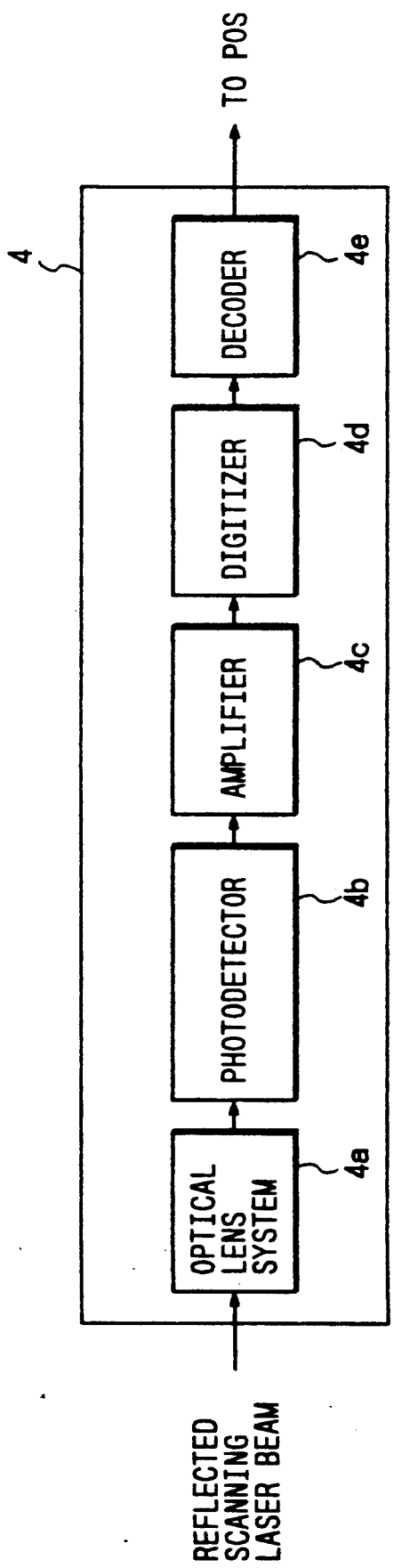
FIG. 7 is a block diagram showing the construction of a light signal receiving unit or receiver incorporated in the bar code reader shown in FIG. 1.

The light signal receiving unit 4 includes, as shown in FIG. 7, an optical system of lenses 4a for collecting the reflected scanning light beam 302 onto a photodetector 4b such as a CCD image sensor which in turn performs a photoelectric conversion to produce an electric signal (analog signal) proportional to the intensity of the reflected scanning laser beam 302 incident upon the photodetector 4b, an amplifier 4c for amplifying the analog signal, a digitizer 4d for converting the analog signal to a proportional digital signal, and a decoder 4e for decoding the digital signal to a data signal.

In short, the light signal receiving unit 4 electrically processes the reflected scanning laser beam 302 to obtain a proportional digital signal, then converts the digital signal into a corresponding data signal, and finally transmits the data signal to the central processing unit in the POS, not shown.

The base 5 including the support member 5a carries on its upper surface the mirror drive unit 2, the scanning mirror 6, and a small mirror 8 for reflecting the scanning laser beam 301 from the laser unit 3 to the scanning mirror 6. On the underside of the base 5, there are supported the laser unit 3, the light signal receiving unit 4 and the motor 7.

Figure 4:
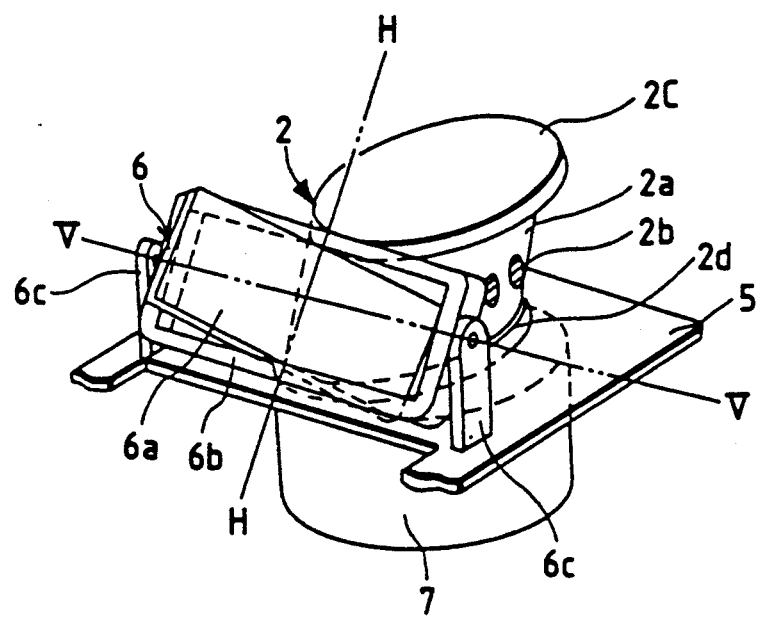
FIG. 4 is a perspective view of a portion of the bar code reader showing a scanning mirror and a mirror drive unit.

The construction and operation of the mirror drive unit 2 and the scanning mirror 6 will be described below in greater detail with reference to FIG. 4.

The scanning mirror 6 is composed of a movable mirror 6a, a frame 6b and a pair of opposed pedestals 6c, 6c.

The movable mirror 6a is in the form of a rectangular plate and pivotally mounted on the frame 6b in such a manner that the mirror 6a is rotatable about an axis H—H (second axis) in a horizontal plane relative to the frame 6b.

Figure 6A:
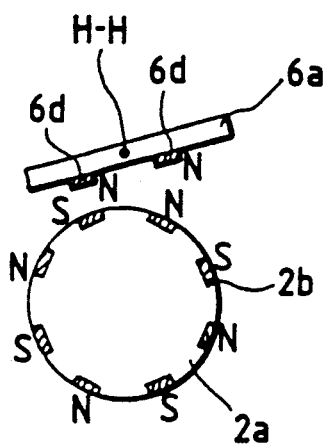
FIGS. 6A and 6B are diagrammatical plan views illustrative of the manner in which the scanning mirror is oscillated about an axis H—H shown in FIG. 4.
Figure 6B:
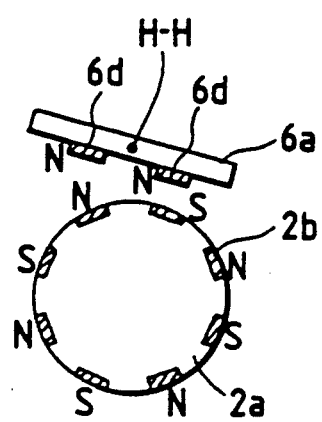

As shown in FIGS. 6A and 6B, a pair of magnets 6d is mounted on the backside of the movable mirror 6a one on each side of the axis of rotation (i.e., the second axis H—H) of the movable mirror 6a, with their north poles N facing outwardly. The magnets 6d are equidistant from the axis H—H of rotation of the movable mirror 6a and disposed at the same level as an axis V—V (first axis) about which the scanning mirror 6 is rotatable in a vertical plane. When the movable mirror 6a oscillates about the second axis H—H, the scanning laser beam 301 is swept to scan a bar code label 10 (FIGS. 1 and 2) in a horizontal direction perpendicularly across bars of the bar code 9.

The frame 6b is a rectangular hollow frame extending around the movable mirror 6a. The rectangular hollow frame 6b has, at longitudinal central portions of the upper and lower sides thereof, a pair of confronting bearings, not shown, for rotatably supporting the movable mirror 6a relative to the frame 6b, the bearings being aligned with the second axis H—H shown in FIG. 4. The frame 6b is pivotally mounted on the pedestals 6c secured to the base 5 and is rotatably movable about the first axis V—V. In response to pivotal movement or oscillation of the frame 6b about the first axis V—V, the scanning laser beam 301 is swept to scan the label 10 in a vertical direction parallel to the bars of the bar code 9.

The mirror drive unit 2 is composed of a drive cam 2a, a plurality of magnets 2b and a pair of plate cams 2c and 2d.

Figure 5A:
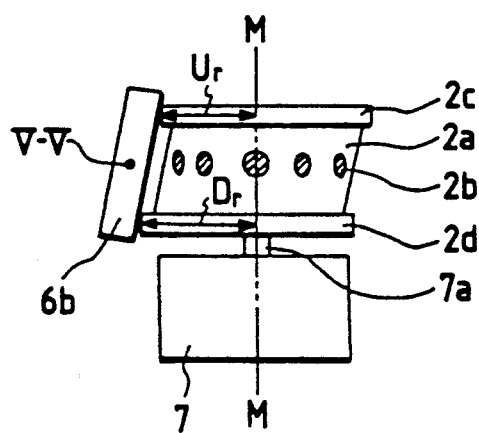
FIGS. 5A and 5B are side views illustrative of the manner in which the scanning mirror is oscillated about an axis V—V shown in FIG. 4.
Figure 5B:
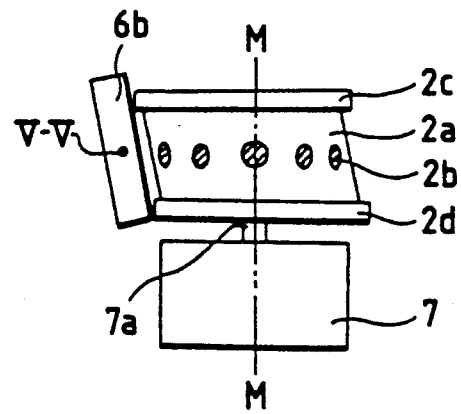

The plate cams 2c, 2d are circular disks and disposed on opposite end faces of the drive cam 2a. The drive cam 2a is of a short oblique circular cylinder having opposite circular end faces to which the circular plate cams 2c, 2d are attached concentrically. The drive cam 2a is connected to the driving force transmission unit 7a such that, as shown in FIGS. 5A and 5B, an axis of rotation M—M of the motor 7 extends perpendicular to the plate cams 2c, 2d and passes through the center of gravity of the oblique circular cylindrical drive cam 2a.

The magnets 2b are composed of a row of alternating north and south pole magnets N and S embedded in a round side wall of the drive cam 2a along a central portion thereof, with their outside surfaces lying flush with the side wall. The magnets 2b are circumferentially spaced at equal intervals which are substantially equal to the distance between the two magnets 6d on the movable mirror 6a, as shown in FIGS. 6A and 6B.

The mirror drive unit 2 of the foregoing construction is disposed behind the scanning mirror 6 with its plate cams 2c, 2d held in contact with central portions of the upper and lower sides of the rectangular hollow frame 6b. The central portions are located on the second axis H—H. The magnets 2b are disposed at the same level as the first axis V—V and the magnets 6d on the movable mirror 6a.

The scanning mirror 6 and the mirror drive unit 2 operate as follows.

A description is first given to the movement of the scanning mirror 6 in a vertical direction about the first axis of rotation V—V with reference to FIGS. 5A and 5B.

Since the drive cam 2a is an oblique circular cylinder as described above, the upper and lower plate cams 2c, 2d are eccentric to the axis of rotation M—M of the motor 7 and the respective centers of the plate cams 2c, 2d are displaced from the axis M—M in opposite directions, i.e., they are 180 degrees out-of-phase about the axis of rotation M—M of the motor 7.

More specifically, in one phase of operation shown in FIG. 5A, the center of the upper plate cam 2c is displaced from the axis of rotation M—M of the motor 7 toward the right hand side, while the center of the lower plate cam 2d is displaced from the axis M—M toward the left hand side. With this eccentric arrangement, the distance Ur between the center of rotation of the upper plate cam 2c and the frame 6b is different from the distance Dr between the center of rotation of the lower plate cam 2d and the frame 6b. In this instance, since the plate cams 2c, 2d are held in contact with the frame 6b, the frame 6b is tilted in a position as illustrated in this figure.

When the motor 7 is energized to rotate the drive cam 2a in one direction, the center of the upper plate cam 2c moves along an arcuate path from a first eccentric position (FIG. 5A) located on the right hand side of the axis of rotation M—M of the motor 7 toward a second eccentric position located on the left hand side of the axis of rotation M—M of the motor 7. At the same time, the lower cam plate 2d which is disposed on a first eccentric position located on the left hand side of the axis M—M is gradually brought into a second eccentric position located on the right hand side of the axis M—M.

Since the frame 6b is rotatable about the first axis V—V, the foregoing rotary motion of the upper plate cam 2c forces the upper portion of the mirror 6 forward.

When the drive cam 2a and the plate cams 2c, 2d attached thereto turn through an angle of 180 degrees from the position of FIG. 5A, the frame 5b is tilted down as shown in FIG. 5B.

As the drive cam 2a is further turned over an angle of 180 degrees from the position of FIG. 5B, the center of the lower plate cam 2d is displaced from the second eccentric position (on the right hand side of the axis M—M) to the first eccentric position (on the left hand side of the axis M—M) in response to which the lower portion of the mirror 6d is forced forwardly. Thus, the frame 6b is tilted up as shown in FIG. 5A.

As appears clear from the foregoing description, rotation of the drive cam 2 causes the plate cams 2c, 2d to oscillate the frame 6b in the vertical direction about the first axis V—V, whereby the scanning mirror 6 oscillates in the vertical direction.

Then, the movement of the scanning mirror 6 in a horizontal direction about the second axis of rotation H—H is described below with reference to FIGS. 6A and 6B.

As shown in FIG. 6A, the movable mirror 6a carries on its backside two magnets 6d of the same polarity (north pole magnets N in the illustrated embodiment). These magnets 6d are located symmetrically about the second axis H—H. On the other hand, the drive cam 2a retains in its round side wall a row of alternating north (N) and south (S) pole magnets 2b circumferentially spaced at equal intervals which are substantially the same as the distance between the two magnets 6d on the mirror 6a. The magnets 6d and the magnets 2b are disposed at a same level which is preferably the same as the level of the first axis V—V (FIG. 4).

When the motor 7 is energized to rotate the drive cam 2a in one direction from the position shown in FIG. 6A, each of north (N) pole magnets 2d is brought into a position where the preceding south (S) pole magnet 2d is initially located. At the same time, each south (S) pole magnet 2d is brought into the initial position of the preceding north (N) pole magnet 2d. With this positional shift of the magnets 2d of opposite polarities, the direction of magnetic forces (attraction and repulsion) acting between the magnets 6d on the movable mirror 6a and the corresponding two magnets 2b on the drive cam 2a is shifted whereupon the movable mirror 6a is tilted down toward the right hand side, as shown in FIG. 6B.

A continuous angular movement of the drive cam 2a causes the north and south pole magnets 2b to replace the preceding south and north pole magnets 2b in position with the result that the direction of the magnetic forces (attraction and repulsion) acting between the magnets 6d on the movable mirror 6a and the corresponding two magnets 2b on the drive cam 2a changes again, thereby tilting the movable mirror 6a down toward the left hand side as shown in FIG. 6A.

As is apparent from the foregoing description, in response to rotation of the drive cam 2a, the direction of the magnetic forces acting between the magnets 6d on the movable mirror 6a and the magnets 2b on the drive cam 2a is shifted cyclically with the result that the movable mirror 6a is oscillated in the horizontal direction about the second axis H—H. Thus, the scanning mirror 6 oscillates in the horizontal direction.

As described above, the scanning mirror 6 oscillates simultaneously in the vertical and horizontal directions in response to rotation of the drive cam 2a. As a consequence of this oscillation, a raster scanning pattern such as shown in FIG. 8 is formed of the scanning laser beam irradiated on the bar codes 9.

The operation of the bar code reader 1 will be described below in greater detail.

Figure 2:
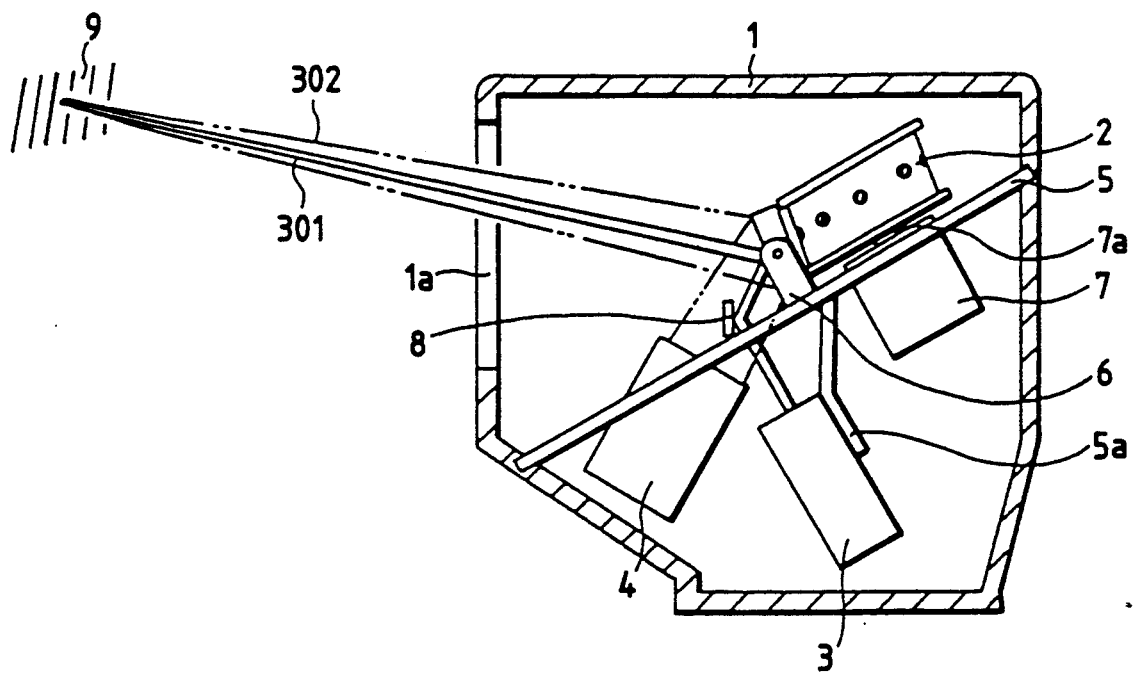
FIG. 2 is a cross-sectional view taken along line II—II of FIG. 1.
Figure 3:
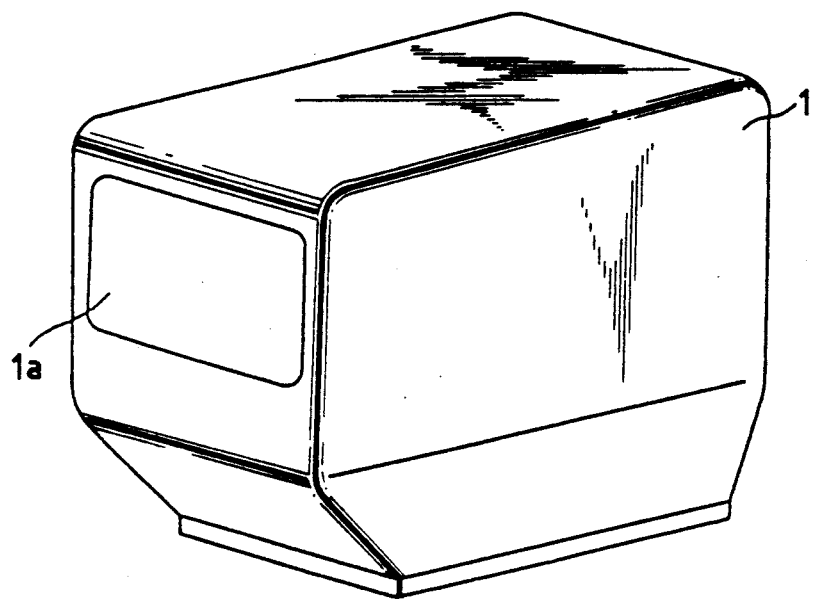
FIG. 3 is a diagrammatical perspective view of the bar code reader shown in FIG. 1.

As shown in FIGS. 1 and 2, a laser beam 301 irradiated from the laser unit 3 is reflected by the small mirror onto the scanning mirror 6 which in turn reflects the laser beam 301 toward the bar codes 9 on a bar code label 10 attached to the outer surface of an object.

The laser beam 301 irradiated from the laser unit 3 subsequently passes through the reading window 1a and strikes the bar code label 10. In this instance, the laser beam 302 is focused on parallel arranged plural rows of bar codes 9 on the bar code label 10 by means of the focusing lens, not shown, disposed in the laser unit 3.

The laser beam 301 is reflected by the bar code label 10 and the reflected laser beam 302 is then transmitted through the reading window 1a and impinges upon the scanning mirror 6. The scanning mirror 6 directs the reflected laser beam 302 toward the light signal receiving unit 4 such that most part of the reflected laser beam 302 is received in the light signal receiving unit 4. In this instance, since the small mirror 8 has only a small area, a part of the reflected laser beam 302 which is transmitted by the small mirror 8 to the laser unit 3 is negligibly small and hence cannot exert a negative influence on the reading of information on the bar codes 9.

The reflected laser beam 302 incident to the light signal receiving unit 4 is collected by the optical lens system 4a onto the photodetector 4b. Then, the photodetector 4b converts changes in the intensity of the reflected laser beam 302 into electric changes of an analog signal which in turn is amplified by the amplifier 4c.

The amplified analog signal is subsequently converted into a digital signal by the digitizer 4d. Thereafter, the digital signal is translated into a data signal by the decoder 4e. The data signal is outputted to a central processing unit in the POS, not shown, whereby the optical information on the bar codes 9 attached to the object is read by the bar code reader 1.

When a rotational driving force is transmitted from the motor 7 to the mirror drive unit 2, the scanning mirror 6 is oscillated bi-directionally (vertically and horizontally) as described above with the result that the laser beam 301 scans the bar codes 9 vertically and horizontally with a raster scanning pattern shown in FIG. 8.

Thus, the bar code reader 1 reads prices of optical information on the parallel arranged rows of bar codes 9.

According to the embodiment described above, the raster scanning pattern can be formed by the combination of a single scanning mirror 6 and a single mirror drive unit 2. Consequently, as against the conventional raster scan type bar code readers, the bar code reader of this invention does not requires two scanning mirrors and the associated drive mechanisms and is, therefore, simple in construction and compact in size.

In the bar code reader of the foregoing embodiment, a single mirror surface is oscillated in the vertical and horizontal directions to form a raster scanning pattern by a spot of the scanning laser beam. On the contrary, in the case of the polygon mirror incorporated in the conventional bar code reader to perform scanning in the horizontal and vertical directions, the number of vertical scanning lines is limited by the number of mirror faces of the polygon mirror because each mirror face must be large enough to form a single horizontal scanning line. Due to the absence of the polygon mirror, the foregoing problem does not take place any longer in the case of the bar code reader of this invention.

Additional preferred embodiments of the present invention will be described below.

In the foregoing embodiment, the vertical scanning is performed by the aid of an eccentric cam composed of the drive cam 2a and the plate cams 2c, 2d, while the horizontal scanning relies on attracting and repelling forces acting between opposed magnet pairs 6d, 2b. The means for transmitting a driving force to the scanning mirror 6 is not limited to those of the foregoing embodiment.

Figure 10A:
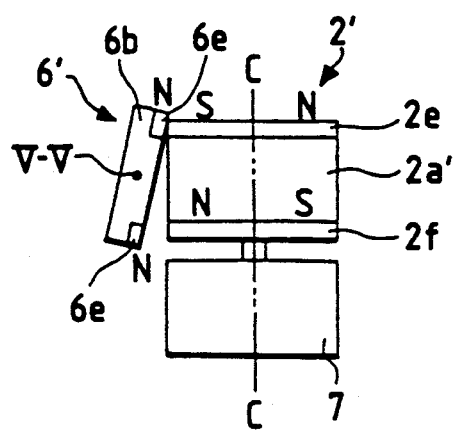
FIGS. 10A and 10B are views similar to FIGS. 5A and 5B, respectively, but showing the vertical oscillation of a scanning mirror according to another embodiment.
Figure 10B:
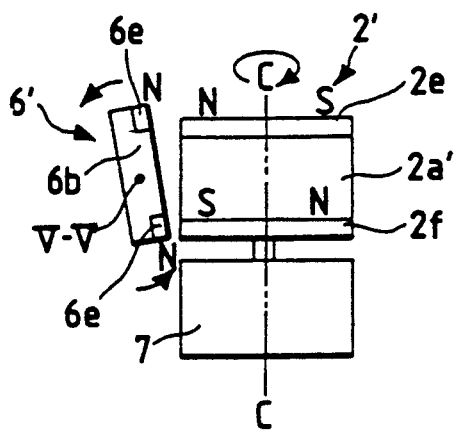

For example, the vertical scanning may be carried out by using magnets, as shown in FIGS. 10A and 10B. The frame 6b of a scanning mirror 6' carries on its backside two magnets 6e of the same polarity (north pole magnets N in the illustrated embodiment). The magnets 6e are disposed in symmetrical relation to one another about the first axis V—V and preferably located on the second axis H—H (see FIG. 4). The mirror drive unit 2' is composed of a circular cylindrical drive member 2a' connected to the motor 7, and a pair of circular plate magnets 2e and 2f attached to opposite ends of the cylindrical drive member 2a'. Each of the plate magnets 2e, 2f has a plurality of circumferentially spaced, alternating north and south poles N and S. The north and south poles of the upper plate magnet 2e are arranged in pair with the south and north poles of the lower plate magnet 2f. The plate magnets 2e, 2f are co-active with the magnets 6e in a manner as described below.

When the mirror drive unit 2' is rotated by the motor 7, the direction of magnetic forces (attraction and repulsion) acting between the magnets 6e on the frame 6b and the successive poles of the plate magnets 2e, 2f changes cyclically, thereby causing the frame 6b and the whole scanning mirror 6' to oscillate vertically about the first axis V—V.

Figure 11A:
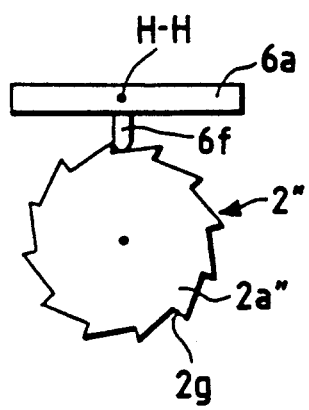
FIGS. 11A through 11C are diagrammatical plan views illustrative of the horizontal oscillation of a modified scanning mirror.
Figure 11B:
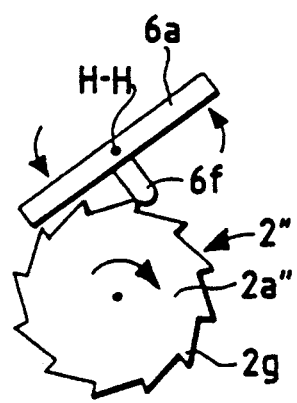
Figure 11C:
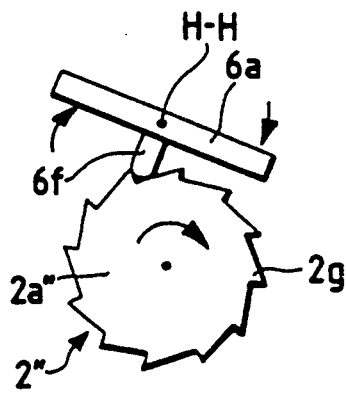

As an alternative means for performing the horizontal scanning, a mirror drive unit 2" comprising a toothed wheel 2a" such as shown in FIGS. 11A through 11C may be used in combination with a pin 6f on the movable mirror 6a. The toothed wheel 2a" has a number of sawtoothed projections 2g on and along its outer edge. The pin 6f which serves as an engagement member projects from the center of the backside of the movable mirror 6a and is held in mesh with one of the successive sawtoothed projections 2g on the toothed wheel 2a". The movable mirror 6a is normally urged by a torsion spring (not shown) to turn about the second axis H—H in the clockwise direction which is the same as the direction of rotation of the toothed wheel 2a".

When the toothed wheel 2a" is rotated clockwise from the position shown in FIG. 11A, one of the sawtoothed projections 2g forces the pin 6f in a direction to turn the movable mirror 6a counterclockwise about the second axis H—H, so that the movable mirror 6a tilts down toward the left hand side as shown in FIG. 11B. As the angular movement of the toothed wheel 2a" further continues, the sawtoothed projection 2g is disengaged from the pin 6f, whereupon the movable mirror 6a turns clockwise about the second axis H—H under the force of the non-illustrated spring. Thus, the movable mirror 6 tilts down toward the right hand side, as shown in FIG. 11C.

With this rotation of the toothed wheel 2a", the movable mirror 6a (i.e., the scanning mirror) is oscillated in the horizontal direction about the second axis H—H.

Figure 9:
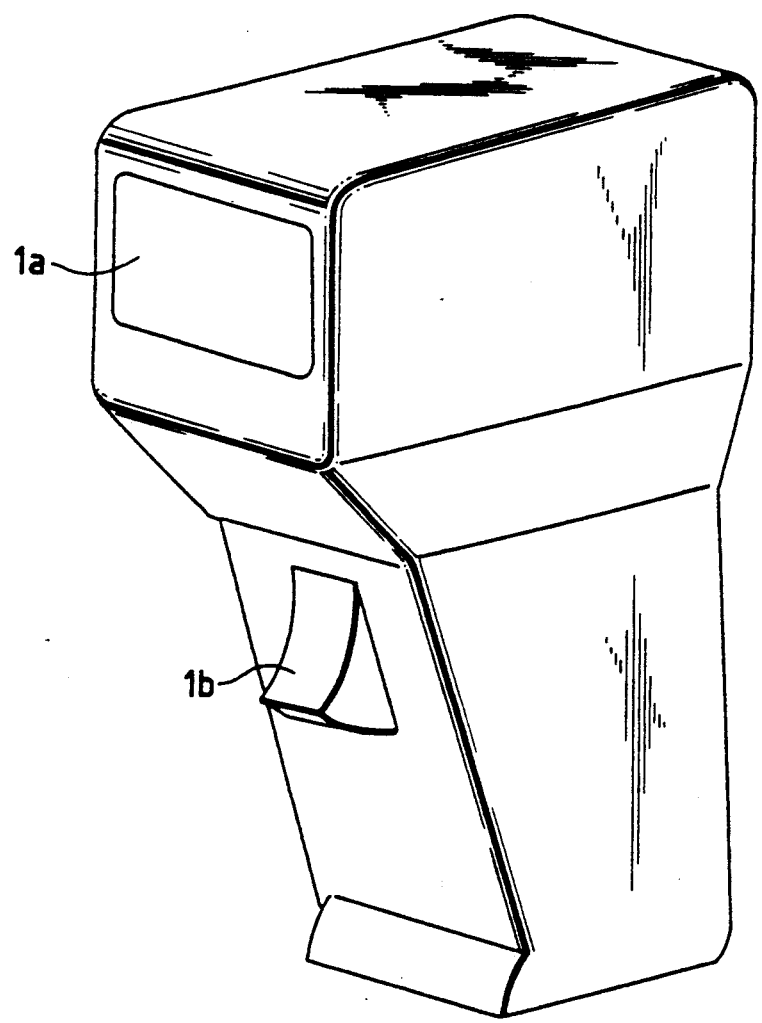
FIG. 9 is a perspective view of a handheld raster scanner according to another embodiment of this invention.

The raster scanning bar code reader illustrated in the foregoing embodiments is of the stationary type. The present invention is not limited to the stationary type bar code reader but also applicable to a handheld type raster scanning bar code reader having a separate handheld unit such as shown in FIG. 9. The handheld unit may contain a power supply and a control circuit (neither shown). Designated by 1b in this figure is an operation switch.

Obviously, various minor changes and modifications of the present invention are possible in the light of the above teaching. For instance, the rotatable mirror drive unit 2, 2' described above may be replaced with a linear actuator such as a cylinder actuator, a solenoid, etc. which is operatively connected with the scanning mirror 6, 6' to oscillate the same simultaneously in the vertical and horizontal directions. It is therefore to be understood that within the scope of the appended claims the invention may be practiced otherwise than as specifically described.

What is claimed is:

1. An apparatus for reading optical information on an object, comprising:
   a light source for irradiating a scanning light beam;
   means, rotatable about a first axis and a second axis perpendicular to said first axis, for reflecting said scanning light beam irradiated from said light source onto said object bearing said optical information;
   a rotatable drive unit for oscillating said reflecting means simultaneously in a first direction about said first axis and a second direction about said second axis such that movement of said reflecting means along said first direction caused by said drive unit is mechanically dependent on movement of said reflecting means along said second direction caused by said drive unit to cause said scanning light beam to be irradiated on said object in a raster scanning pattern;
   drive means for rotating said drive unit to oscillate said reflecting means; and
   means for receiving light reflected from said object and reading said optical information on said object in accordance therewith.

2. An apparatus according to claim 1, wherein said reflecting means comprises a hollow frame rotatable about said first axis, and a movable mirror pivotally mounted within said hollow frame and rotatable about said second axis.

3. An apparatus according to claim 1, wherein said drive unit comprises an eccentric cam engageable with said reflecting means and rotated by said drive means to oscillate said reflecting means in said first direction about said first axis.

4. An apparatus according to claim 3, wherein said eccentric cam comprises an oblique circular cylindrical drive cam connected to said drive means, a first plate cam attached concentrically to one end face of said drive cam, and a second plate cam attached concentrically to the opposite end face of said drive cam, said first and second plate cams being held in contact with said reflecting means.

5. An apparatus according to claim 4, wherein said reflecting means comprises a hollow frame rotatable about said first axis, and a movable mirror pivotally mounted within said hollow frame and rotatable about said second axis, said first and second plate cams being held in contact with a pair of diametrically opposite portions of said hollow frame across said movable mirror.

6. An apparatus according to claim 5, wherein said diametrically opposite portions of said hollow frame are disposed along said second axis.

7. An apparatus according to claim 1, wherein said reflecting means includes at least one magnet of a predetermined polarity disposed on one side of said second axis, and said drive unit includes a plurality of alternating north and south magnets circumferentially arranged along a direction of rotation of said drive unit and successively co-active with said magnet on said reflecting means to oscillate said reflecting means in said second direction about said second axis in response to rotation of said drive unit.

8. An apparatus according to claim 7, wherein said magnet of said reflecting means and said magnets of said drive unit are disposed at the same level as said first axis.

9. An apparatus according to claim 7, wherein said reflecting means comprises two of said magnets of said predetermined polarity, said two magnets of said reflecting means being equidistant from said second axis, said magnets of said drive unit being circumferentially spaced at equal intervals which are substantially equal to the distance between said two magnets of said reflecting means.

10. An apparatus according to claim 7, wherein said drive unit further includes an eccentric cam comprising an oblique circular cylindrical drive cam mechanically coupled to said drive means, a first plate cam mechanically coupled concentrically to a first end face of said drive cam, and a second plate cam mechanically coupled concentrically to a second end face of said drive cam opposite to said first end face, and said reflecting means comprises a hollow frame rotatable about said first axis, and a movable mirror pivotally mounted within said hollow frame and rotatable about said second axis, said first and second plate cams being held in contact with a pair of diametrically opposite portions of said hollow frame disposed on opposite sides of said first axis, said magnets of said drive unit being embedded in a side wall of said drive cam, said magnet of said reflecting means being disposed on a backside of said movable mirror.

11. An apparatus according to claim 10, wherein said diametrically opposite portions of said hollow frame are disposed along said second axis.

12. An apparatus according to claim 1, wherein said reflecting means includes an engagement member, and said drive unit includes a plurality of circumferentially spaced projections successively engageable with said engagement member to oscillate said reflecting means in said second direction about said second axis in response to rotation of said drive unit.

13. An apparatus according to claim 12, wherein said reflecting means includes a movable mirror rotatable about said second axis and normally urged to turn about said second axis in one direction, said engagement member is a pin projecting from a backside of said movable mirror, said circumferentially spaced projections are sawtoothed projections disposed along an outer edge of a toothed wheel of said mirror drive unit, said pin alternately meshing with said projections.

14. An apparatus according to claim 13, wherein said pin is disposed on said second axis.

15. An apparatus according to claim 1, wherein said reflecting means includes at least one magnet of a predetermined polarity disposed on one side of said first axis, and said drive unit includes a plurality of alternating north and south pole magnets circumferentially arranged along a direction of rotation of said drive unit and co-active with said magnet on said reflecting means to oscillate said reflecting means in said first direction about said first axis in response to rotation of said drive unit.

16. An apparatus according to claim 15, wherein said drive unit comprises a circular cylindrical drive member connected to said drive means, and a circular plate magnet attached to one end of said drive member and having a plurality of circumferentially spaced, alternating north and south magnetic poles.

17. An apparatus according to claim 16, wherein said reflecting means comprises two of said magnets of said predetermined polarity, said two magnets of said reflecting means being disposed on opposite sides of said first axis, said drive unit further including an additional circular plate magnet attached to an opposite end of said drive member and having a plurality of circumferentially spaced, alternating north and south magnetic poles, said north and south magnetic poles of said plate magnet being opposed to the south and north magnetic poles of said additional plate magnet.

18. An apparatus according to claim 16, wherein said reflecting means includes a hollow frame rotatable about said first axis having said magnet of said reflecting means, attached thereto and a movable mirror pivotally mounted within said hollow frame and rotatable about said second axis.

19. An apparatus for reading optical information on an object, comprising:
- a light source for irradiating a scanning light beam;
- means, rotatable about a first axis and a second axis perpendicular to said first axis, for reflecting said scanning light beam irradiated from said light source onto said object bearing said optical information, said reflecting means including a hollow frame rotatable about said first axis and a movable mirror pivotally mounted within said hollow frame and rotatable about said second axis;
- raster forming means for oscillating said hollow frame and said movable mirror of said reflecting means simultaneously in a first direction about said first axis and a second direction about said second axis perpendicular to said first axis, respectively, such that movement of said hollow frame along said first direction caused by said forming means is mechanically dependent on movement of said movable mirror along said second direction caused by said forming means to cause said scanning light beam to be irradiated on said object in a raster scanning pattern; and
- means for receiving light reflected from said object and reading said optical information on said object in accordance therewith.

20. An apparatus according to claim 19, wherein said raster forming means includes a rotary member for oscillating at least one of said hollow frame and said movable mirror.

21. An apparatus according to claim 20, further comprising a motor operatively coupled to said rotary member for rotating said rotary member to cause said rotary member to oscillate at least one of said hollow frame and said movable mirror.

* * * * *

UNITED STATES PATENT AND TRADEMARK OFFICE
CERTIFICATE OF CORRECTION

PATENT NO. : 5,252,816
DATED : OCTOBER 12, 1993
INVENTOR(S) : ONIMARU ET AL

It is certified that error appears in the above-identified patent and that said Letters Patent is hereby corrected as shown below:

On title page, change

"(75) Inventors: Sadhisa Onimaru, Okazaki; Atsuo . . . "

to

—(75) Inventors: Sadahisa Onimaru, Okazaki; Atsuo . . .—

Signed and Sealed this

Twelfth Day of April, 1994

Attest:

BRUCE LEHMAN

Attesting Officer   Commissioner of Patents and Trademarks